United States Patent
Fuehrer et al.

(10) Patent No.: US 6,458,303 B1
(45) Date of Patent: Oct. 1, 2002

(54) SCREEN ELEMENT

(76) Inventors: Frank Fuehrer, Breslauer Strasse 2, D-74321, Bietigheim-Bissingen (DE); Birgit Pieruschka, Goethestrasse 9, D-71576, Burgstetten (DE); Frank Sommer, Kandelstrasse 5, D-72336, Balingen (DE)

( * ) Notice: Subject to any disclaimer, the term of this patent is extended or adjusted under 35 U.S.C. 154(b) by 0 days.

(21) Appl. No.: 09/424,316

(22) PCT Filed: May 16, 1998

(86) PCT No.: PCT/EP98/02890

§ 371 (c)(1),
(2), (4) Date: Feb. 17, 2000

(87) PCT Pub. No.: WO98/52670

PCT Pub. Date: Nov. 26, 1998

(30) Foreign Application Priority Data

May 22, 1997 (DE) .......................... 197 21 427

(51) Int. Cl.$^7$ ............................. B29D 31/502
(52) U.S. Cl. ................. 264/153; 210/455; 210/460; 210/477; 210/497.01; 210/499; 264/DIG. 48; 264/163; 264/266
(58) Field of Search ............... 210/499, 503, 210/505, 507, 473, 477, 500, 27, 483, 497.01, 455, 459, 460; 264/DIG. 48, DIG. 66–DIG. 67, DIG. 70, DIG. 76, 340, 338, 46.4, 46.9, 48, 257, 271.1, 266, 163, 153; 4/290–291

(56) References Cited

U.S. PATENT DOCUMENTS

| | | | | |
|---|---|---|---|---|
| 743,091 A | * | 11/1903 | Loop | |
| 2,839,056 A | * | 6/1958 | Mailly | |
| 2,883,058 A | * | 4/1959 | Jaume | |
| 3,382,984 A | * | 5/1968 | Kuss | |
| 3,731,815 A | * | 5/1973 | Collingwood et al. | 210/496 |
| 3,746,595 A | * | 7/1973 | Leason | |
| 3,762,564 A | * | 10/1973 | Weedon et al. | 210/446 |
| 3,804,258 A | * | 4/1974 | Okuniewski et al. | 210/460 |
| 4,118,323 A | * | 10/1978 | Sugiyama et al. | |
| 4,138,303 A | * | 2/1979 | Taylor, Sr. | |
| 4,312,753 A | * | 1/1982 | Bell | 210/250 |
| 4,361,128 A | * | 11/1982 | Goldman et al. | |
| 4,374,026 A | * | 2/1983 | Greutert | |
| 4,617,121 A | * | 10/1986 | Yokoyama | 210/416.4 |
| 4,882,055 A | * | 11/1989 | Stamstad | |
| 5,266,194 A | * | 11/1993 | Chiodo | |
| 5,375,629 A | * | 12/1994 | Wilson | |
| 5,417,906 A | * | 5/1995 | Chiodo | |
| 5,736,043 A | * | 4/1998 | Nichols et al. | 210/477 |
| 5,738,786 A | * | 4/1998 | Winnington-Ingram | 210/474 |
| 5,942,113 A | * | 8/1999 | Morimura | 210/487 |

FOREIGN PATENT DOCUMENTS

| | | | |
|---|---|---|---|
| DE | 400170 A1 | * | 12/1990 |
| DE | 19537269 | * | 4/1997 |
| FR | 2567405 | * | 1/1986 |

OTHER PUBLICATIONS

Derwent Abstract of EP 400170A1.*

* cited by examiner

*Primary Examiner*—Matthew O. Savage
*Assistant Examiner*—Marianne Ocampo
(74) *Attorney, Agent, or Firm*—Crowell & Moring LLP

(57) ABSTRACT

A method for making a screen filter, especially for filtering liquid or gaseous materials, in which the screen filter comprises a mounting ring or mounting element (10) and a filtering screen arranged on the mounting ring or mounting element. The filtering screen is composed of a mesh web fabric (15) and can be connected to a basket-shaped support skeleton (16). The mounting ring (10) and the support skeleton (16) are injection-molded around the mesh web fabric (15).

3 Claims, 1 Drawing Sheet

SCREEN ELEMENT

BACKGROUND OF THE INVENTION

The invention relates to a screen element, especially for the filtration of liquid or gaseous materials.

In DE 195 37 269 a screen element is disclosed; it is disposed in an intake tube in an internal combustion engine. The element is composed of metal wire and has the purpose of making the flow of intake more uniform and thereby provide for noise reduction. Such screen elements are usually made by laying a piece of prefabricated screen into an injection molding machine and there injection molding a mounting ring around it. Since a certain stability of the screen element is necessary, metal is preferably used for the screen area.

Screen elements of the kind named above are used in all areas of technology. Due to the demand for a certain stability of shape, materials of great stiffness are basically preferred.

The disadvantage in the use of such materials is that, for the sake of great stiffness the material must have a certain thickness. The disadvantage thus arises that the resistance to flow is increased due to the greater use of material.

SUMMARY OF THE INVENTION

It is the object of the invention to avoid the aforementioned disadvantages and provide a sieve or screen element which has low resistance to flow but at the same time is of stable shape.

This object is achieved by the invention as described and claimed hereinafter.

The substantial advantage of the invention is that a mesh web can be used as material for the screen element, which may not be stable in shape, but does have a low resistance to flow. Stability of shape is achieved by the fact that the mesh web is attached to a supporting skeleton. This supporting skeleton can be composed of a thermoplastic synthetic resin and can be configured according to the application, that is, it can be optimally adapted to the application. It is also possible to use thermosetting plastics or elastomers for making the supporting skeleton.

In one preferred embodiment of the invention the supporting skeleton is attached to the mounting ring or mounting element. Thus its stability of shape is increased.

In accordance with a further embodiment of the invention the mesh web is a synthetic fabric and is made from monofilament or multifilament fibers. To increase the effective area of the screen element, any desired free-form surfaces or ruled surfaces can be chosen. Such a screen element is suitable for various media, such as air, water, fuel, oil or the like, and can be used both in automobile manufacture and in medicine or in general apparatus construction.

An advantage in the use of a mesh web is great elasticity, and indeed in both the longitudinal and transverse directions. This elasticity prevents damage to the screen element in case of severe loading.

A method for producing a screen element for filtering liquids or gases with a mounting ring and holding element, and a sieve or screen filter disposed thereon, has the following steps: A mesh fabric is placed as a screen filter into a production machine and can be imbedded by injection molding in a supporting skeleton and a mounting ring and holding element of thermoplastic synthetic resin. The mesh fabric can be a knit, and in a preferred embodiment of the invention, can be fed to the molding machine from a strip and then severed from this strip to deposit a length of fabric in the mold cavity.

Additional features of preferred embodiments of the invention will be found not only in the claims but also in the description and the drawings, and the individual features can be realized each by itself or together in the form of subcombinations in embodiments of the invention and in other fields, and may constitute advantageous as well as independently patentable embodiments, for which protection is hereby claimed.

BRIEF DESCRIPTION OF THE DRAWINGS

The invention will be explained in further detail below with reference to an example.

DETAILED DESCRIPTION OF PREFERRED EMBODIMENTS

Figure 1:
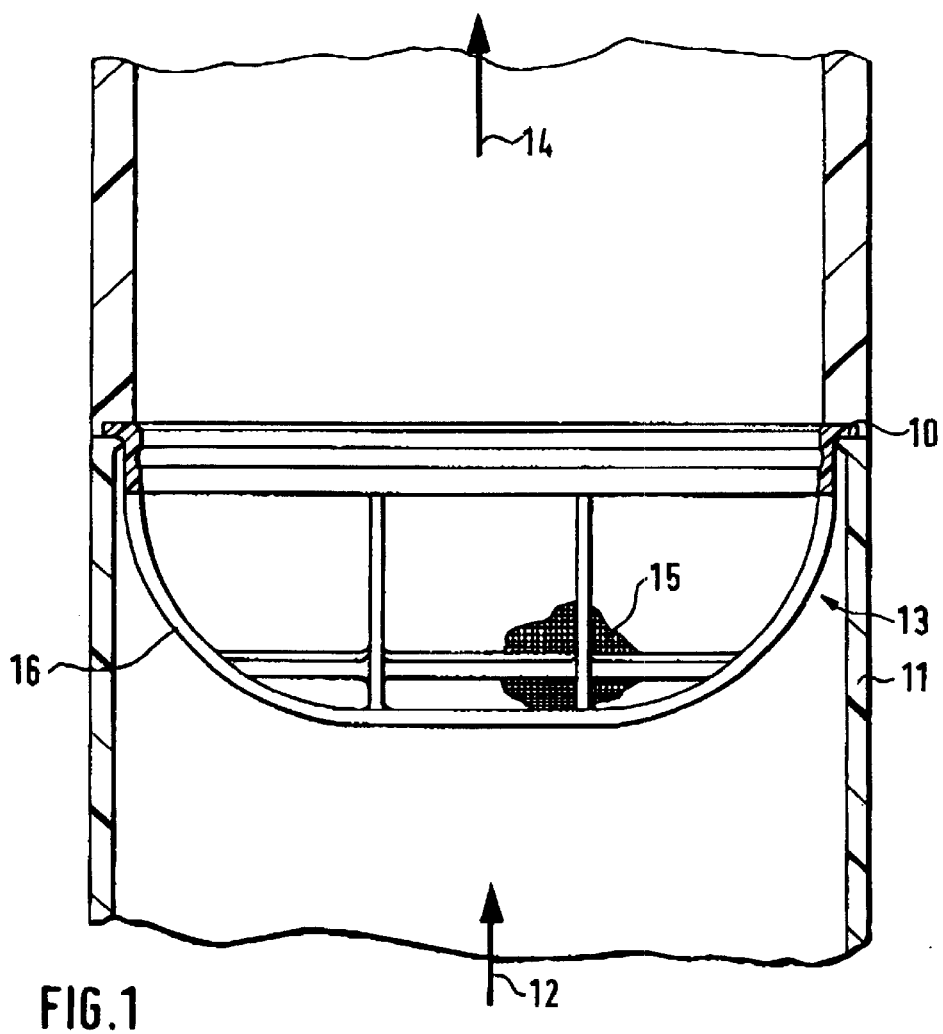
FIG. 1 shows a screen basket in a side view

The side elevation of a screen element in FIG. 1 shows a mounting ring 10 which is inserted in a tube 11. Air or liquid is fed through this tube in the direction of the arrow 12, flows through the screen element 13 and leaves this filtration area in cleaned condition according to arrow 14. The screen element 13 is comprised—as already mentioned—of a mounting ring 10 on which a mesh web fabric 15 is disposed, as well as a supporting skeleton 16 for the mesh web.

The mesh web is a textile sheet material which is produced by weaving or knitting. The special property of a mesh web or mesh material is its elasticity, by yielding to tension in the lengthwise, transverse and diagonal direction, and by returning to the former position when the stress ceases. Mesh material can be shaped very well, the degree of its elasticity depending on the material, the mesh strength and the kind of binding. Another valuable property is its high permeability to air. Especially when used as a sieve or screen or filter element, this high air or liquid permeability is necessary along with a good retention capacity for foreign matter.

The supporting skeleton 16 is attached to the mounting ring 10 and is produced in a thermoplastic injection molding process and bonded to the mesh web material 15. An advantage of this supporting skeleton is that areas or points on the surface of the screen element 13 which are subjected to heavy loading, can be equipped with a reinforcing structure.

Figure 2:
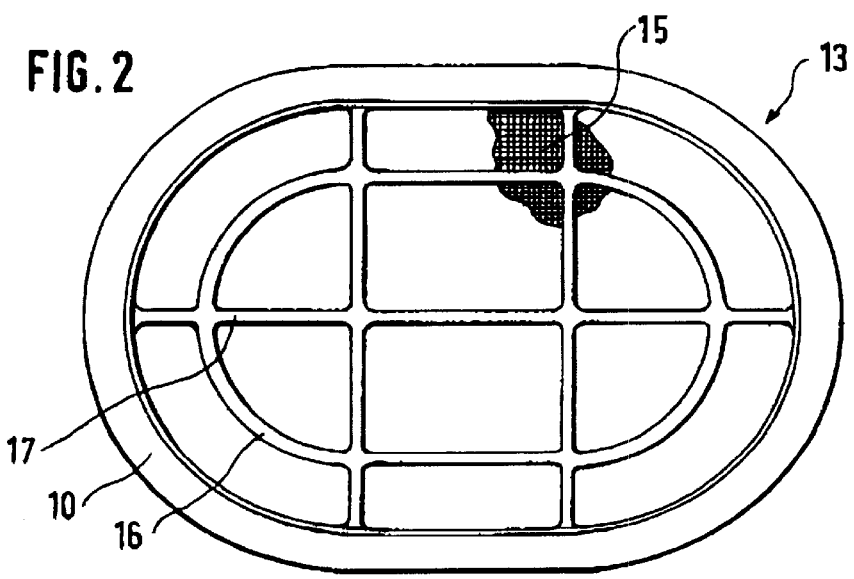
FIG. 2 shows a screen basket in a top plan view

In accordance with FIG. 2, which contains the top plan view of the screen element 13, the supporting skeleton 16 is adapted substantially to the shape of the mounting ring 10; the strongly loaded central region of the mesh web 15 is equipped with a continuous lengthwise bridge or strap 17. This lengthwise bridge 17 has the purpose of withstanding the main pressure of the fluid being cleaned. The bulging shape of the screen element 13 increases, on the one hand, the effective filter area, and on the other hand the moment of resistance to the fluid and against the direction of flow is increased. As shown in FIG. 1, the basket-shaped screen is supported by a basket-shaped support skeleton.

What is claimed is:

1. A method of making a screen filter for filtering liquids or gases, said filter comprising a mounting ring and a screen element disposed thereon, said method comprising the steps of:

feeding a length of mesh web fabric from a strip to a mold cavity of an injection molding machine and then severing the mesh fabric, said mesh web fabric comprising a fabric produced from synthetic monofilament or multifilament fibers, and injection molding a mounting ring and a basket-shaped support skeleton of thermoplastic synthetic resin material around said mesh web fabric to configure the screen filter in the shape of a basket to give the filter an increased effective filter area and an increased moment of resistance to the liquids or gases being filtered, said basket-shaped support skeleton comprising a continuous longitudinal strap extending across a central region of said mesh web fabric.

2. A method according to claim 1, wherein said mesh web fabric is a knitted fabric.

3. A method of making a screen filter for filtering liquids or gases, said filter comprising a mounting ring and a screen element disposed thereon, said method comprising the steps of:

feeding an elastic mesh fabric to a mold cavity of an injection molding machine, said mesh fabric comprising a fabric produced from synthetic monofilament or multifilament fibers, and injection molding a mounting ring and a basket-shaped support skeleton of thermoplastic synthetic resin material around said mesh web fabric to configure the screen filter in the shape of a basket to give the filter an increased effective filter area and an increased moment of resistance to the liquids or gases being filtered, said basket-shaped support skeleton comprising a continuous longitudinal strap extending across a central region of said mesh web fabric.

* * * * *